United States Patent [19]
Belzberg

[11] Patent Number: 6,134,535
[45] Date of Patent: *Oct. 17, 2000

[54] COMPUTERIZED STOCK EXCHANGE TRADING SYSTEM AUTOMATICALLY FORMATTING ORDERS FROM A SPREADSHEET TO AN ORDER ENTRY SYSTEM

[75] Inventor: Sydney H. Belzberg, Toronto, Canada

[73] Assignee: Belzberg Financial Markets & News International Inc., Toronto, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,389

[22] PCT Filed: Mar. 3, 1995

[86] PCT No.: PCT/CA95/00123

§ 371 Date: Sep. 19, 1996

§ 102(e) Date: Sep. 19, 1996

[87] PCT Pub. No.: WO95/26005

PCT Pub. Date: Sep. 28, 1995

[30]     Foreign Application Priority Data

Mar. 23, 1994 [CA] Canada .................................... 2119921

[51] Int. Cl.⁷ ..................................................... G06F 17/60

[52] U.S. Cl. ................................................. 705/37; 705/36

[58] Field of Search ................................. 705/37, 35, 36; 345/333; 707/1, 3, 4, 5, 6, 10, 100, 102; 709/200, 207, 204, 217, 218, 219

[56]                 References Cited

U.S. PATENT DOCUMENTS

| | | | |
|---|---|---|---|
| 4,674,044 | 6/1987 | Kalmus et al. ............................ | 705/37 |
| 4,750,135 | 6/1988 | Boilen ................................. | 395/200.61 |
| 4,868,866 | 9/1989 | Williams, Jr. ............................ | 380/49 |
| 5,101,353 | 3/1992 | Lupien et al. ............................ | 705/37 |
| 5,297,031 | 3/1994 | Gutterman et al. ....................... | 705/37 |
| 5,297,032 | 3/1994 | Trojan et al. ............................ | 705/37 |
| 5,339,392 | 8/1994 | Risberg et al. ......................... | 345/333 |
| 5,675,746 | 10/1997 | Marshall .................................. | 705/35 |

FOREIGN PATENT DOCUMENTS 401 203   12/1990   European Pat. Off. .

OTHER PUBLICATIONS

Kelly, Doug, "Broker's Software Advances Computerized Stock Trading", Financial Post (Toronto, Canada), Sec. 1, p. 1, Aug. 14, 1992.

Mesa User's Guide—Beta Release—Jul. 1992 together with Release Note dated Jul. 1, 1992.

Mesa User's Guide—Release 1.5, Athena Design, Inc., May 1993 (particularly pp. 3, 4, 26, 275, and Section 2 pp. 7–15).

Monsen, L., Using Microsoft© Excel® 97, Chapters 19 and 20, Copyright® 1997, pp. 305–337.

Nextworld, Mesa spreadsheet product advertisement and article, winter 1992.

Nextworld, Mesa spreadsheet product advertisement and article, Feb./Mar. 1993.

Nextworld, Mesa spreadsheet product advertisement, Apr/May. 1993.

(List continued on next page.)

*Primary Examiner*—Emanuel Todd Voeltz
*Assistant Examiner*—Alexander Kalinowski
*Attorney, Agent, or Firm*—Kenyon & Kenyon

[57]                ABSTRACT

An improvement in computer automated stock exchange trading whereby a graphic user interface with a mouse and display is used to select parameters such as share symbol, price selection, order size, and transaction type, as well as other indicators to launch a trading order to the order entry system of a stock exchange computer. Further improvements include a programmed interface by which data on a group of shares may be read from a spreadsheet formulated into an order and launched automatically or in response to a signal from an operator so as to trade an index or basket of shares substantially instantaneously.

53 Claims, 7 Drawing Sheets

OTHER PUBLICATIONS

Nextworld, Mesa spreadsheet product advertisement, Jun./Jul. 1993.

Nextworld, Mesa spreadsheet product advertisement and article, Aug. 1993.

Nextworld, Mesa spreadsheet product advertisement, Sep. 1993.

Nextworld, Mesa spreadsheet product advertisement, Oct. 1993.

Nextworld, Mesa spreadsheet product advertisement, Nov. 1993.

Nextworld, Mesa spreadsheet product advertisement, Dec. 1993.

Nextworld, Mesa spreadsheet product advertisement, Feb. 1994.

Nextworld, Mesa spreadsheet product advertisement, Mar. 1994.

Nextworld, Mesa spreadsheet product advertisement, Apr. 1994.

Dialog File 16 (Gale group PROMT(R)), "Mesirow 'Black Box' Integrates Order Routing on ADP T.1 Network", Wall Street Network News, 3 pages, May 7, 1993.

"Davidge Debuts DOT/PC Order Routing for NYSE Members," Trading Systems Technology, Wafers Information Services, Inc., Sep. 28, 1987, p. 1.

"SIA Technology Show Bucks Down Market: Blue Smoke and Mirrors at Hilton Bash," Trading Systems Technology, Waters Information Services, Inc., Feb. 15, 1988, pp. 1–4.

"Slim Pickin's at FinCom: A Vegas Trade Show in NYC," Trading Systems Technology, Waters Information Services, Inc., Jul. 18, 1988, pp. 1–3.

"Quotron's Open Windows: Q1000 Data for PC Users," Trading Systems Technology, Waters Information Services, Inc., Oct. 10, 1988, pp. 1–3.

"What's Next on Wall Street's Automation Agenda?," I. Schmerken, Wall Street Computer Review, vol. 6, No. 7, Apr., 1989, pp. 44–50.

"The Bulls and Bears Come Out at Night; Electronic Trading," I. Schmerken, Wall Street Computer Review, vol. 7, No. 12, Sep., 1990, pp.14–23.

"Financial Technology Corp. Unveils Basket Trading System," Trading Systems Technology, Waters Information Services, Inc., Jun. 17, 1991, pp. 1–2.

"TST Interviews Bob McFarlane, Head of Consultants Interport," Trading Systems Technology, Waters Information Services, Inc., Jul. 1, 1991, pp. 1–6.

"Data Exchange, Salomon Launch Equities Order–Routing System," Trading Systems Technology, Waters Information Services, Inc., Jul. 29, 1991, pp. 1–2.

"LIT Uses Beats to Route Orders to NYSE's Superdot," Trading Systems Technology, Waters Information Services, Inc., Sep. 23, 1991, pp. 1–3.

"J.P. Morgan Selects Unix for Program–Trading Group," Trading Systems Technology, Waters Information Services, Inc., Apr. 20, 1992, pp. 1–3.

"Nikko N.Y. Taps Davidge, Sun for Equities Trading Systems," Trading Systems Technology, Waters Information Services, Inc., Apr. 20, 1992, pp. 1–2.

"Wall Street's Quiet Revolution," I. Schmerken, Wall Street & Technology, vol. 9, No. 10, Jun., 1992, pp.25–32.

"CIBC/Wood Gundy Proprietary Traders Lead the Way for 275–Position Room," Trading Systems Technology, Waters Information Services, Inc., Jul. 13, 1992, pp. 1–3.

"Reuters Buys Chunk of Effix; Expands Triarch/Effic Line," Trading Systems Technology, Waters Information Services, Inc., Jun. 15, 1992, pp. 1–4.

"WOSA Extensions for Real–Time Market Data," Backgrounders and White Papers, Microsoft Development Library, Jan., 1994, pp. 1–8.

"Canadian Brokerage Hedges with On–Line Expertise," I, Schmerken, Wall Street Computer Review, Dec., 1990, pp. 66–69.

Canadian Quantex User Manual, vol. I: Trade Execution, Release Version 1.1, RBC Dominion Securities Inc. and Investment Technology Group, Inc., Toronto, Canada, 1992.

Quantex Analytics, RBC Dominion Securities Inc. and Investment Technology Group, Inc., Toronto, Canada, May 7, 1993, pp. 1–26.

Janet Bush, "NYSE Takes Sting Out of Baskets", Financial Times, p. 34, Sep. 15, 1989.

| | A | B | C | D | E | F | G | H | I |
|---|---|---|---|---|---|---|---|---|---|
| 14 | | | | | | | | | |
| 15 | | | INDEX | 220.293597 | 221.643484 | | 221.01182 | 223.592281 | DOWN |
| 16 | SYM | SHS | Bid Size | Bid | Ask | Ask Size | LAST | Yesterday | |
| 17 | AL | 1500 | 115 | 31 | 31.125 | 151 | 31.125 | 32 | |
| 18 | AGT | 1000 | 393 | 17.125 | 17.25 | 475 | 17.125 | 17.25 | |
| 19 | BBD.D | 1000 | 128 | 20 | 20.125 | 198 | 20.125 | 20.25 | |
| 20 | B | 2000 | 300 | 48.625 | 48.75 | 646 | 48.625 | 48.875 | |
| 21 | BNS | 1000 | 20 | 30.75 | 30.875 | 464 | 30.75 | 31.375 | |
| 22 | BMO | 1400 | 146 | 29.125 | 29.25 | 282 | 29.25 | 29.5 | |
| 23 | CM | 1500 | 95 | 34.375 | 34.625 | 110 | 34.375 | 34.75 | |
| 24 | CKY | 700 | 17 | 27.75 | 27.875 | 64 | 27.875 | 28 | |
| 25 | CP | 2000 | 41 | 22.875 | 23 | 174 | 22.875 | 23.5 | |
| 26 | CTR.A | 2000 | 44 | 12.375 | 12.5 | 171 | 12.375 | 12.875 | |
| 27 | ECO | 1000 | 18 | 17 | 17.25 | 115 | 17 | 17.375 | |
| 28 | IMO | 500 | 17 | 46.375 | 46.625 | 93 | 46.5 | 47 | |
| 29 | IMS | 1000 | 71 | 39.625 | 39.75 | 46 | 39.625 | 10.125 | |
| 30 | LAC | 1500 | 100 | 11.375 | 11.5 | 902 | 11.375 | 11.5 | |
| 31 | LDM.B | 1500 | 888 | 8.5 | 8.625 | 5 | 8.625 | 8.875 | |
| 32 | MB | 1000 | 141 | 23 | 23.125 | 9 | 23 | 23.375 | |
| 33 | MCL | 1000 | 45 | 25.625 | 25.75 | 22 | 25.625 | 25.25 | |
| 34 | MHP | 1000 | 908 | 16.125 | 16.25 | 883 | 16.125 | 16.25 | |

FIG. 4

COMPUTERIZED STOCK EXCHANGE TRADING SYSTEM AUTOMATICALLY FORMATTING ORDERS FROM A SPREADSHEET TO AN ORDER ENTRY SYSTEM

This invention relates to automated means for effecting the purchase and sale of shares traded on a stock exchange. More particularly, it relates to computer software and hardware by which an operator may instantaneously effect the transfer of shares of a large number of corporations.

BACKGROUND

For many years the trading of shares listed on a stock exchange were effected by the activities of people known as traders on the trading floor of a stock exchange, and were confirmed by some form of notation or writing on paper. Once effected, the trades or transfers of shares were formally reported to brokers for the purchasing and selling customers in a formal way with or without the delivery of the share certificates.

More recently the transactions have become automated so that trades may be done by a trader operating a keyboard to enter the necessary commands into a terminal connected to the mainframe computer of the stock exchange, or a small personal computer with a terminal emulator. With this automated system a trader may enter an order to buy or sell which is transmitted to the central system of the stock exchange where it matched with another trader who is willing to sell or buy the same shares, and the computer then confirms the completion of the transaction to each trader, and the transaction is confirmed and recorded by means of a hard copy generated on a printer.

Although this computerized automated system was much faster than the trading floor, it still required a trader to key in by hand the necessary data and commands for each individual stock being traded. From the information available at a terminal, the trader/operator would have to input the symbol for the company shares, the price, the exchange, the size of the order, and the instructions to buy, sell, cross or short trade the stock.

It has even become possible to effect trades in certain stocks automatically when they reach a certain price level.

However, modern investment strategies involve the investment in large groups or "basket" of listed shares as part of an entire portfolio which is strategically selected to provide a balance of growth potential, income generation, and risk avoidance. These portfolios are often held by mutual funds, banks, insurance companies, or other institutional investors, and they are frequently being changed to adjust the balance in the factors which effect growth, income and risks.

Some institutions invest in an established mixture of stocks which reflect the current economic climate in the country, such as the TSE 35, the TSE 100, the TSE 300, and in the United States the Dow Jones or other representative portfolios. In some cases institutional investors will establish their own collection of shares which it considers to represent their investment strategy and objectives. These may be weighted in favour of industry groups such as mining companies, financial institutions, manufacturing, or others considered preferable by the investment manager.

As a result of this strategy of investing in a mixed "basket" of shares, institutional investors are often increasing or decreasing their investment in the entire range of shares in a basket or index. This therefore requires a large number of trades in order to effect the single investment move. Hitherto, this has been done by a trader/operator keying in the necessary trades in each individual stock through a computer terminal. Where the portfolio includes a list of 100 stocks, for example, this is a lengthy process and in fact the problem arises that the prices of many shares would change during the time it takes to key in the various orders, and the original conditions necessary to satisfy the requirements of the particular trade may no longer be present.

SUMMARY OF THE INVENTION

It is therefore the purpose of the present invention to provide an automated, computerized trading system in which multiple share order entries can be executed automatically within seconds by the trader/operator in activating a few entries on a keyboard. This method of trading is accomplished by means of the present invention in which a list of stocks is continually monitored and their prices recorded on a "spreadsheet format" on a personal computer and displayed on a screen. When the composite price of the list of stocks conforms to certain predetermined parameters, the trader can execute the necessary instructions to transform the list into an order on the personal computer (which is connected to the computerized order entry system of the stock exchange, which may be a mainframe), and the order will be immediately processed by the computer and sent to the exchange's order entry system. Thus, the purchase or sale of a basket comprising various numbers (volumes) of a variety of shares can be executed in a matter of seconds before the price or other conditions have changed.

By means of the system programmed in accordance with the present invention, a conventional terminal or personal computer capable of communication with a stock exchange central computer can be adapted to read, process, and react to information from the stock exchange, and/or commands of the operator and automatically and quickly perform multiple trades in a manner described above.

DESCRIPTION OF THE PREFERRED EMBODIMENT

The invention may be better understood by a description of one embodiment with reference to the attached drawings in which.

Figure 1:
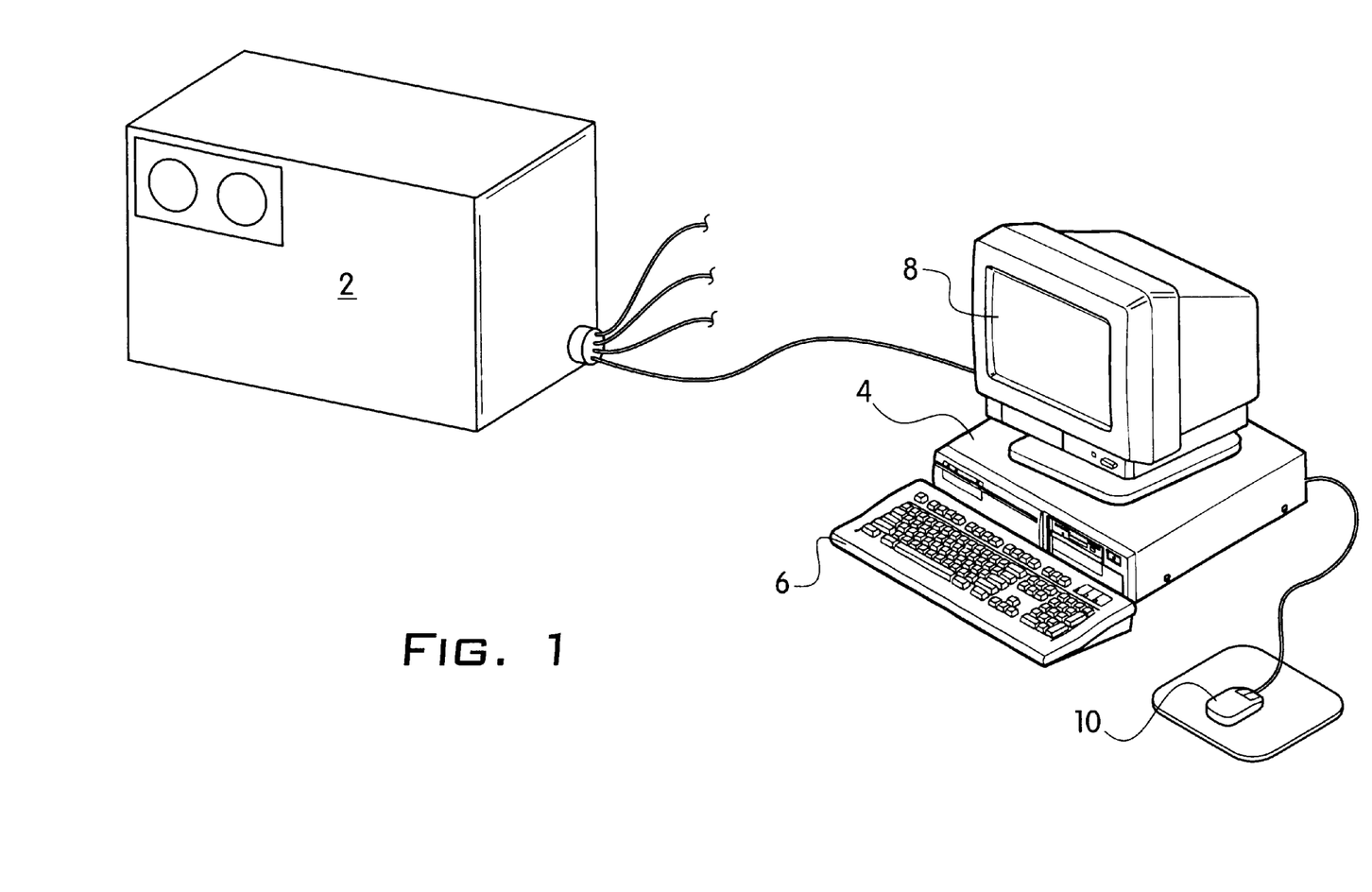
FIG. 1 is a schematic illustration of a mainframe stock exchange computer to which a series or terminals or personal computers are connected each comprising a display screen and keyboard.

In the system illustrated in the attached drawings FIG. 1 shows a mainframe computer 2 used to process all the data relating to the stocks listed on a stock exchange, such as the TSE, the VSE, or the NYSE, as the case may be. Since the advent of computerized trading, these mainframe central computers are connected to a variety of terminals, such as 4, in various trading offices of brokerage houses through the city and abroad. By means of the individual terminals, traders may review data on the display screen 8 and input the necessary information and instructions on the keyboard 6 whereby a given volume of a particular stock is bought or sold (or crossed or shorted) in a manner which is the automated equivalent of an individual transaction on the trading floor.

Such a network is referred to, in the case of the Toronto Stock Exchange, as "CATS" which is an abbreviation for "Computer Aided Trading System", and similar systems are now commonly used and operated by many stock exchanges.

Figure 2A:
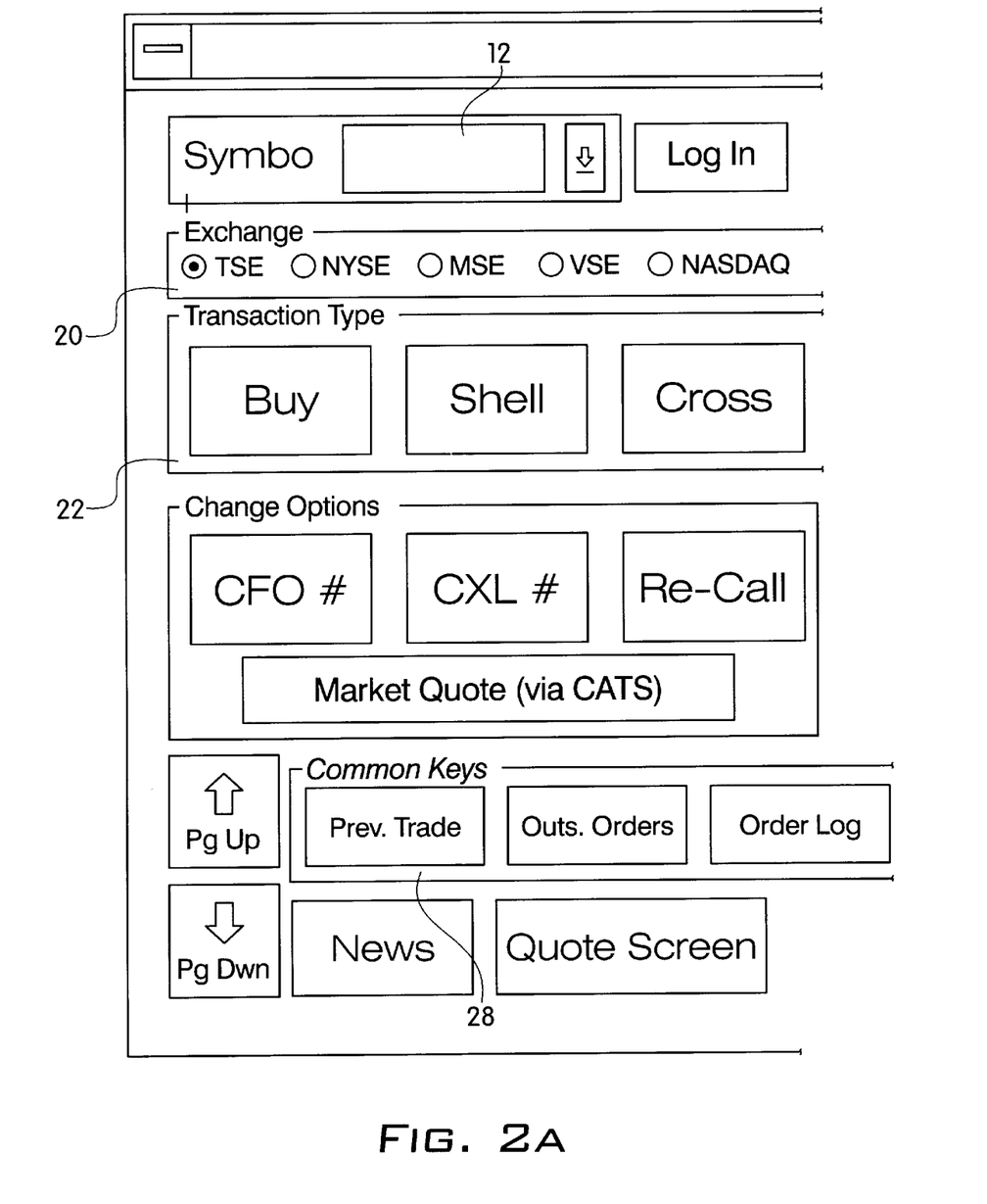
FIGS. 2A, 2B and 2C show a graphic user interface suitable for use in executing single stock transactions.
Figure 2B:
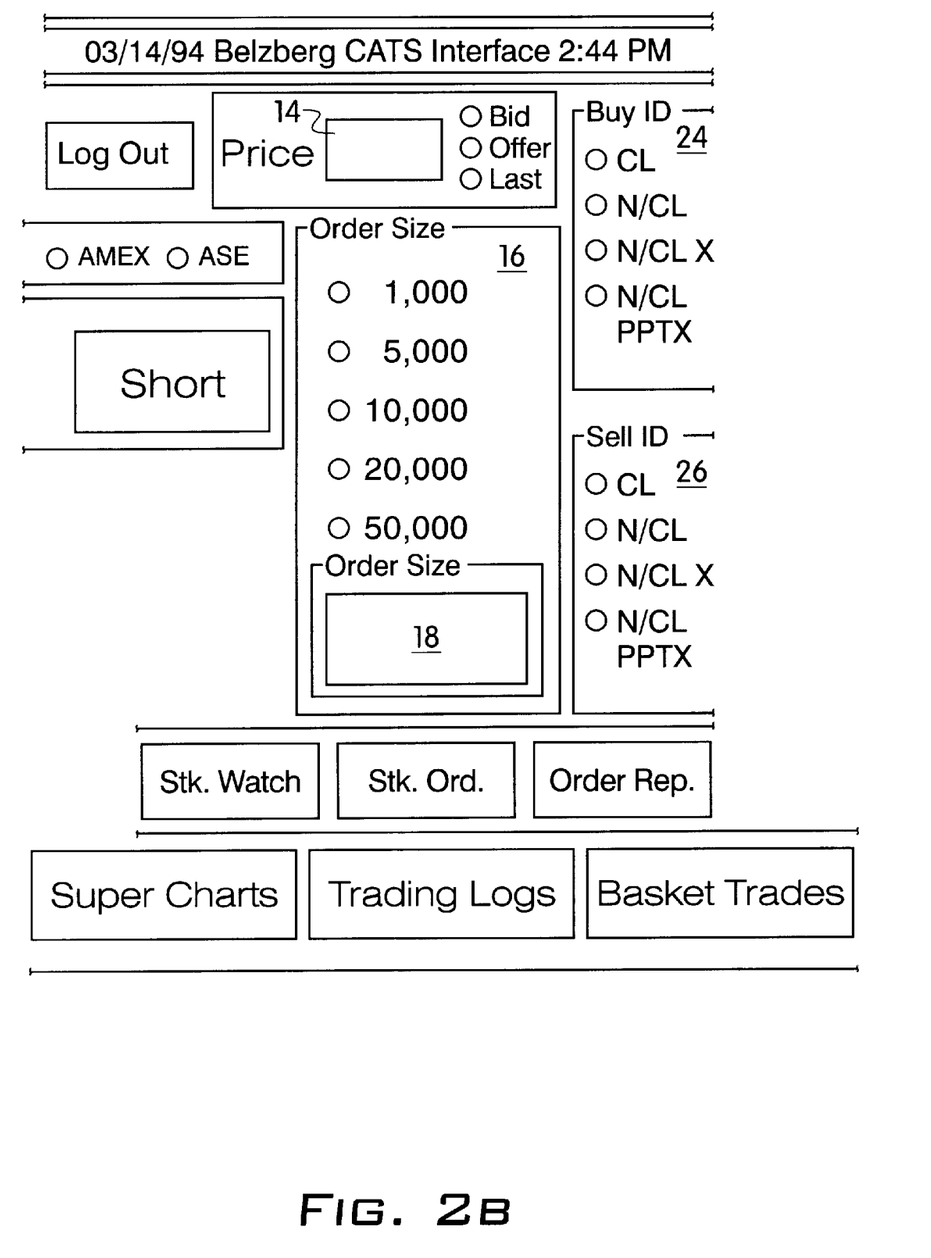
Figure 2C:
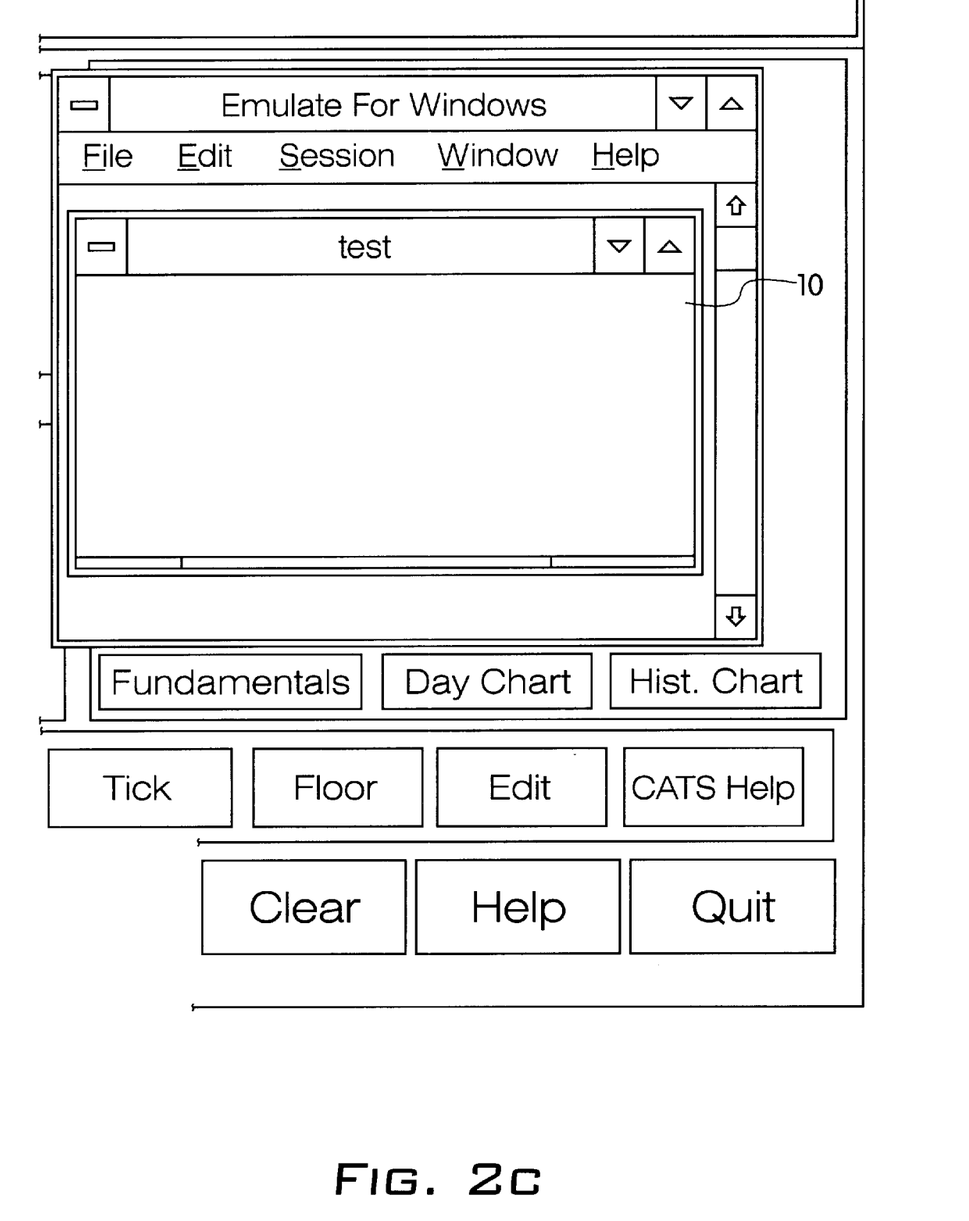

FIG. 2 illustrates an improvement which comprises a graphic user interface with a network such as CATS which allows a trader/operator to use the trading system more quickly and efficiently.

Whereas previously the data necessary for a transaction (stock symbol, volume, price, buy or sell, etc., etc.) had to be entered on the keyboard and showed up in the screen area 10 before the order could be launched to the central processing unit, the present invention allows the instructions to be put in much more quickly, more easily and with less error.

In the embodiment illustrated in FIG. 2, the trader/operator can enter the symbol representing the stock in the area 12 followed by the price at which the transaction is to be completed in space 14 (which may be a selected price or the bid offer or last price derived from the CATS data). Then the size of the order (or volume of the transaction) may be indicated in space 16 by selecting the appropriate nominal figures 1,000, 5,000, 10,000, 50,000 or by inserting the precise volume in the box 18. Many of the instruction choices provided by this interface (such as bid, offer, last, ID, volume, exchange, transaction) may be entered without keying by using a mouse as illustrated at 10 in FIG. 1, which directs a cursor or indicator to the command.

In the illustrated embodiment the other information may be selected, such as the appropriate exchange in area 20, the type of transaction in area 22, the buy and sell IDs in areas 24 and 26. Other areas 28 provided by the interface include features to provide various information from the data bank as an aid to the operator.

To effect individual transactions an operator may, by mouse or a combination of mouse and keyboard, enter the necessary data and commands and quickly transmit the transaction to a stock exchange.

Thus, by means of the interface illustrated in FIG. 2, transactions of a single stock through a computer aided trading system may be more quickly and efficiently executed.

Figure 3A:
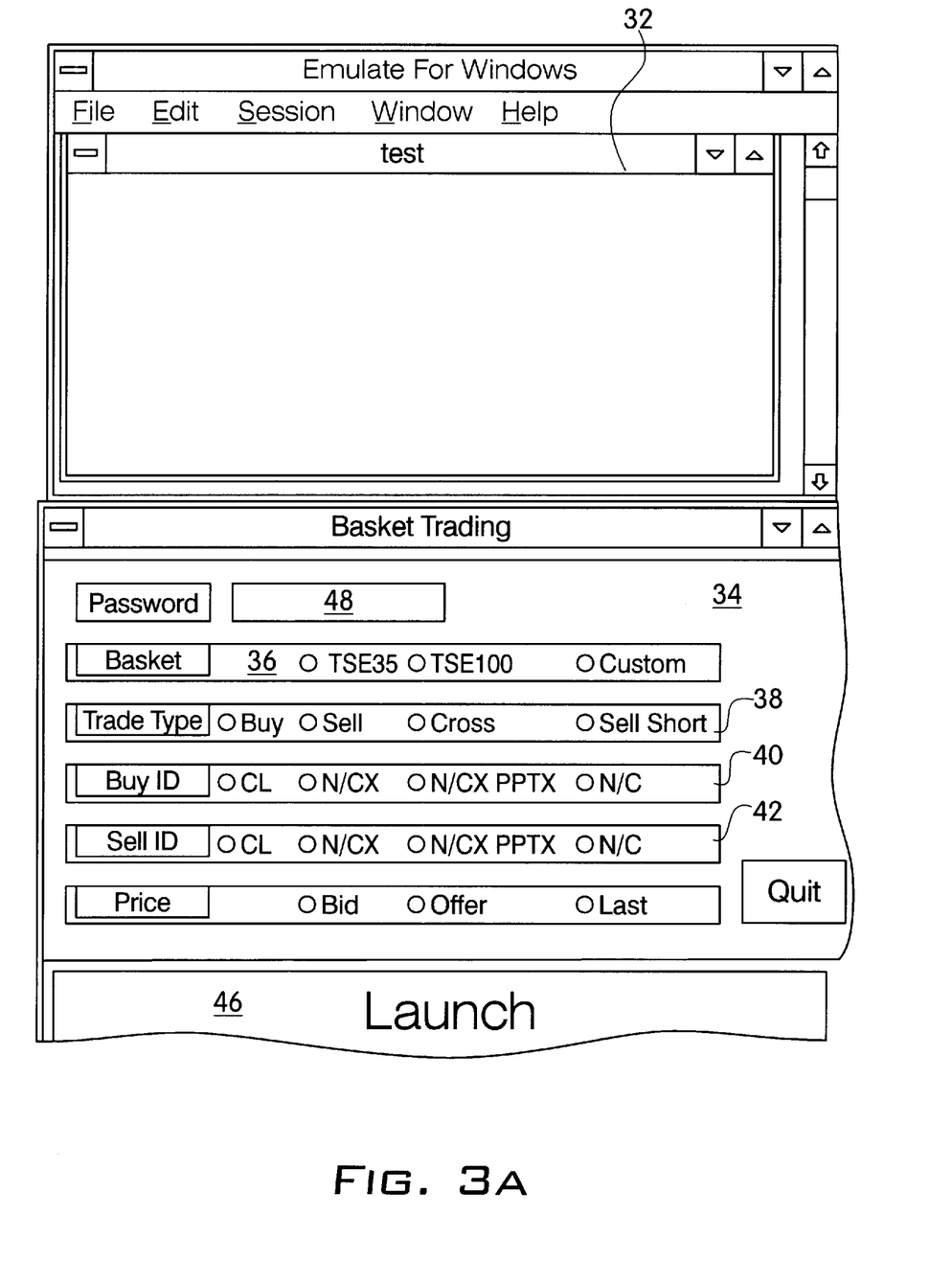
FIGS. 3A and 3B show a graphic user interface used in effecting multiple trades in a basket comprising various volumes of a list of shares.
Figure 3B:
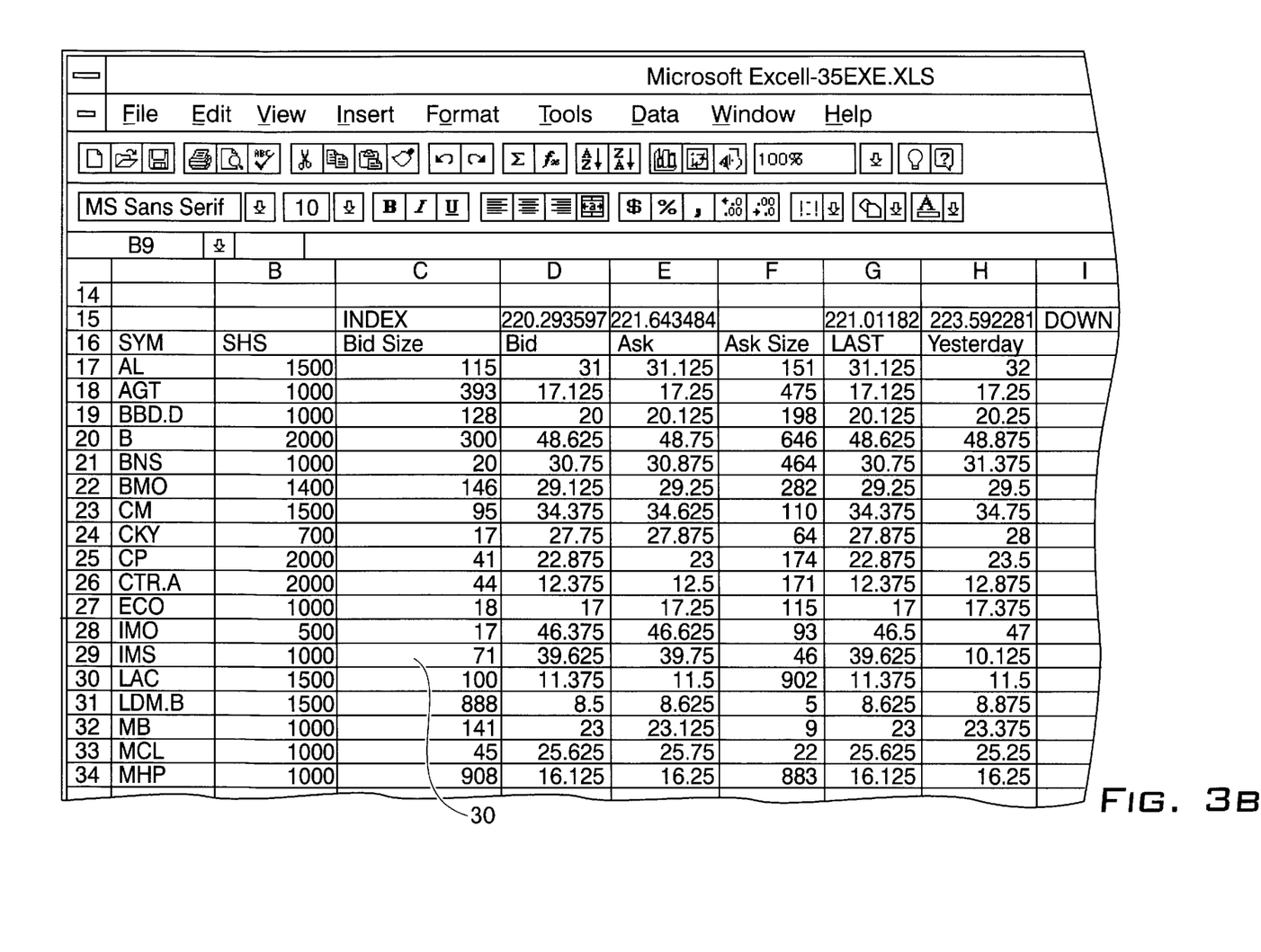

The second aspect of the present invention is illustrated in FIG. 3 which is a reproduction of a display screen which is part of the multiple stock trading system.

By means of the software of this invention, the terminal or personal computer illustrated in FIG. 1 can be used to connect the spreadsheet of the system to the data base of the stock exchange mainframe and display the information (including symbol, volume of shares, bid, first and last price) in the area 30 of the display screen of the terminal as shown in FIG. 3. For purposes of trading an index or custom basket of shares, the display will contain the information with respect to the shares included in the index or basket as illustrated. The system then executes a dynamic data link to the spreadsheet which causes the spreadsheet to read the list of stocks to the multiple order trading system of the present invention. In the next step the system captures the spreadsheet data and makes each stock price and volume a variable that is inserted in a list of preprogrammed commands. The list is then sent to the order entry system of the stock exchange with a single key stroke.

Thus, each of the stocks and the pertinent data relating thereto is entered into the multiple order entry system, and at the appropriate time and with the appropriate command, the entire basket can be dealt with in a single transaction within a matter of seconds before prices or other criterion change.

The present system therefore eliminates the need for a trader/operator to enter each individual stock and the transaction criterion, which in the case of 100 stocks or so, would be time-consuming, prone to error, and difficult to coordinate because of the changing prices and their relationship to the transaction criterion.

Also illustrated in FIG. 3 is a box 32 in which the necessary commands may be entered from a keyboard.

Also illustrated, in area 34, is a series of commands which may be quickly entered by means of a mouse or similar device, including identification of the basket of shares to be traded 36, the type of transaction (buy, sell, cross, or sell short) 38, the appropriate buy ID 40 or sell ID 42, and the price (bid, offer, or last) 44. When the appropriate commands have been entered the transaction may be executed by pressing the launch button 46 and all of the shares of the basket are traded almost instantaneously.

As in all cases a provision is made for the entry of a pass word 48 to provide security against unauthorized use and other functions which are commonly associated with graphic user interface are provided.

Therefore, by means of the present system, a terminal or personal computer may be used to capture from a spreadsheet all the data necessary to trade in a selected list or group of shares, and by inserting this data into the preprogrammed commands of the system, all of the necessary commands to execute the trade in all of the shares may be sent to the stock exchange order entry system in a single set of signals.

It will be appreciated that this system will enable a trader to deal in baskets of shares, whether they are related to a standard index, such as the TSE 35 or the TSE 100, or a customized basket of shares designed for or by each customer and will be able to effect transactions quickly and without the complications that arise from the time delay in entering each stock transaction separately.

Figure 4:
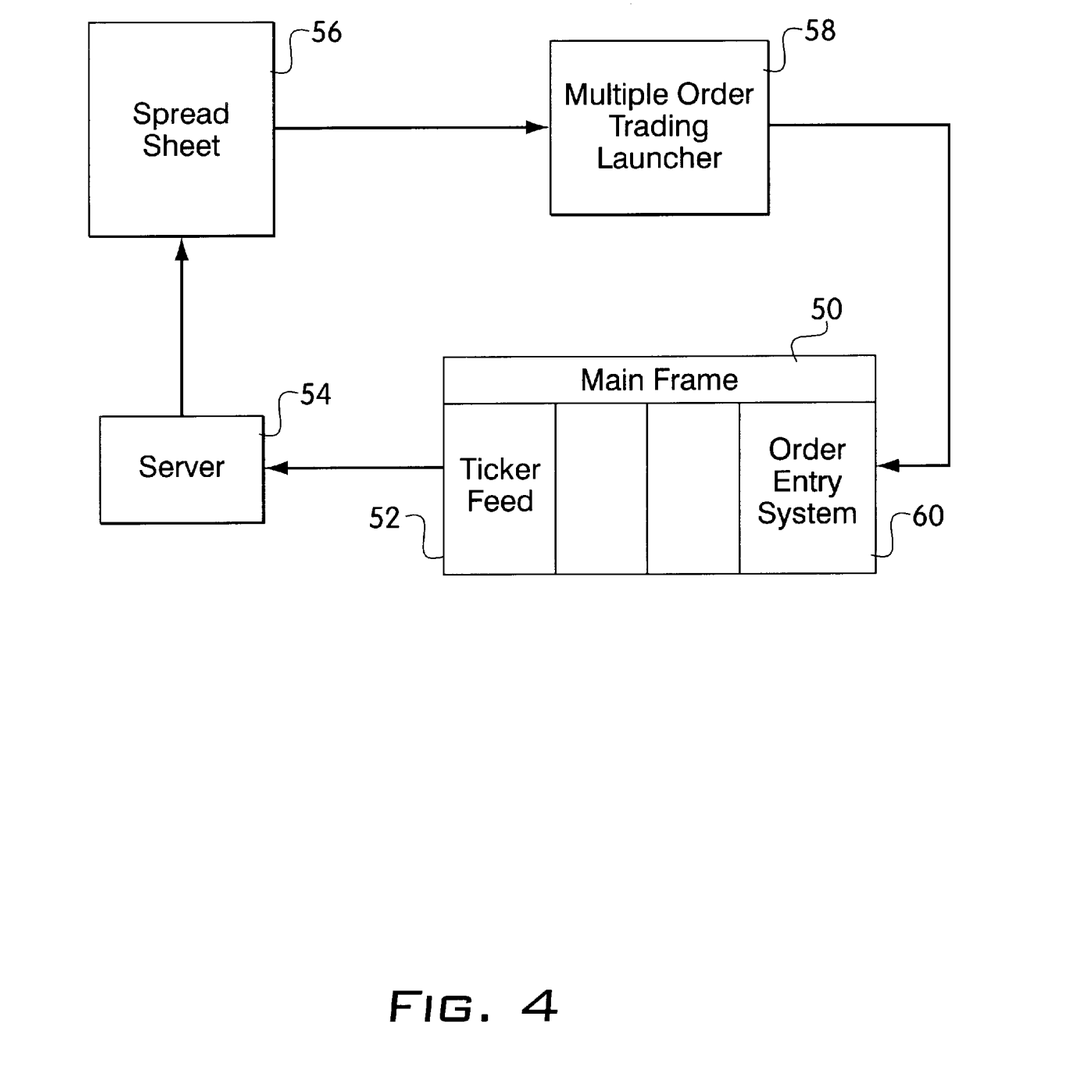
FIG. 4 is a schematic block diagram which illustrates the sequence and flow of data and commands by which the system is used.

FIG. 4 is a block diagram and flow chart which illustrates schematically how the present invention facilitates a faster more efficient operation of the automated trading facilities. In the diagram the mainframe or central computer of the stock exchange is shown at 50 and includes a ticker feed system 52 which constantly generates updated data on the prices and volumes of various stocks being traded, and delivers the updated data to a server 54 where the data is stored and accessible to any terminals which are connected to the network. The information in the server is read by the spreadsheet 56 of a terminal, such as the one illustrated in FIG. 1, which is designed to read and display a given basket of shares with the pertinent data with respect to volumes, bid, offer, last, etc. Block 58 represents the multiple order trading system of the present invention which reads the data from the spreadsheet, including all the data on a given basket of shares, organizes the data into the proper format for automated trading, and issues the multiple orders to the order entry system 60 of the central computer 50 at the stock exchange.

By having the data formatted by the multiple order launcher, the transaction of a whole basket of shares can be effected quickly, easily, with fewer errors and within the time frame for which the criterion or instructions for the transaction are valid.

By providing a means, such as the multiple order launcher, which is capable of capturing all the data on a spreadsheet, selecting what is required, and organizing it into the form of an order, the present invention creates a bridge between the spreadsheet, which contains the necessary data on a group of stocks, and the order entry system of the stock exchange which effects a transaction in those stocks.

Furthermore, because it can use and format the data more quickly and correctly than an operator on a keyboard, it is capable of effecting a transaction within the time and parameters which are rapidly changing, in a manner which an operator could not accomplished. Therefore, instead of merely processing data, it is capable of activating and controlling stock transactions. In this respect the system may be adapted to initiate a transaction automatically when certain criterion are met, or may be designed to create a signal when the criterion are met so that a trader/operator may make the final decision or judgment to execute the transaction or not, and may then execute it substantially instantaneously once the decision has been made.

Once the order entry has been received by the exchange system, the transaction is completed and the appropriate records and confirmation documents are produced in the usual manner without any further activity by the trader.

It will, of course, be realized that numerous modifications and variations from the illustrated embodiments may be employed without departing from the inventive concept herein.

The embodiments of the invention in which an exclusive property or privilege is claimed are defined as follows:

1. A computerized trading system comprising:
 a display; and
 a controller coupled to the display, the controller:
  receiving data from an exchange,
  transferring the received data to a spreadsheet,
  selecting at least one group of data from the spreadsheet,
  formatting the selected at least one group of data for transmission to an order entry system of the exchange, the formatting involving converting each item of the selected at least one group of data from the spreadsheet into a corresponding variable for insertion into a previously programmed list of commands of an order entry system of the exchange, and
 transmitting the formatted selected at least one group of data to the order entry system of the exchange.

2. The system according to claim 1, wherein the data is received from the exchange in real time.

3. The system according to claim 1, wherein the formatted selected at least one group of data is transmitted based on at least one variable parameter.

4. The system according to claim 1, wherein the formatted selected at least one group of data is transmitted based on at least one predetermined parameter.

5. The system according to claim 1, further comprising an interface coupled to the controller, the interface interacting with the display and affecting the selecting, formatting and transmitting by the controller.

6. The system according to claim 1, wherein the at least one group of data is selected based on at least one variable parameter.

7. The system according to claim 6, further comprising an interface coupled to the controller, the interface interacting with the display, and wherein the selecting, formatting and transmitting by the controller are controlled based on the interaction of the interface with the display.

8. The system according to claim 1, wherein the at least one group of data is selected based on at least one predetermined parameter.

9. The system according to claim 8, further comprising an interface coupled to the controller, the interface interacting with the display, and wherein the selecting, formatting and transmitting by the controller are controlled based on the interaction of the interface with the display.

10. The system according to claim 1, wherein the display includes a graphic display.

11. The system according to claim 10, wherein the graphic display includes representations of symbol, price, order size and transaction type.

12. The system according to claim 1, further comprising an interface coupled to the controller.

13. The system according to claim 12, wherein the transmitting is affected by at least one operator interaction with the interface.

14. The system according to claim 12, wherein the selecting is affected by at least one operator interaction with the interface.

15. The system according to claim 12, wherein the interface is a mouse.

16. The system according to claim 12, wherein the interface is a mouse and a keyboard.

17. The system according to claim 12, wherein the interface securedly interacts with the display.

18. The system according to claim 17, wherein the secured interacting includes the prior input of a security code.

19. The system according to claim 12, wherein the interface interacts with the display.

20. The system according to claim 19, wherein the interface is a mouse, and the display includes a graphic display.

21. The system according to claim 19, wherein the selecting, formatting and transmitting by the controller are controlled based on the interaction of the interface with the display.

22. A computerized trading system comprising:
 a display including a graphic display, the graphic display including representations of symbol, price, order size and transaction type;
 a controller coupled to the display, the controller:
  receiving data from an exchange in real time,
  transferring the received data to a spreadsheet,
  selecting at least one group of data from the spreadsheet,
  formatting the selected at least one group of data for transmission to an order entry system of the exchange, the formatting involving converting each item of the selected at least one group of data from the spreadsheet into a corresponding variable for insertion into a previously programmed list of commands of an order entry system of the exchange, and
  transmitting the formatted selected at least one group of data to the order entry system of the exchange; and
 an interface coupled to the controller, the interface interacting with the graphic display, wherein the selecting, formatting and transmitting by the controller are controlled based on the interaction of the interface with the graphic display.

23. A method for computerized trading comprising the steps of:
 receiving data from an exchange;
 transferring the received data to a spreadsheet;
 selecting at least one group of data from the spreadsheet;

formatting the selected at least one group of data for transmission to an order entry system of the exchange, the formatting involving converting each item of the selected at least one group of data from the spreadsheet into a corresponding variable for insertion into a previously programmed list of commands of an order entry system of the exchange; and transmitting the formatted selected at least one group of data to the order entry system of the exchange.

24. The method according to claim 23, further comprising the step of processing the received data in the spreadsheet.

25. The method according to claim 23, further comprising the step of processing the received data from the spreadsheet.

26. The method according to claim 23, wherein the data is received from the exchange in real time.

27. The method according to claim 23, wherein the at least one group of data is selected based on at least one variable parameter.

28. The method according to claim 23, wherein the at least one group of data is selected based on at least one predetermined parameter.

29. The method according to claim 23, wherein the formatted selected at least one group of data is transmitted based on at least one variable parameter.

30. The method according to claim 23, wherein the formatted selected at least one group of data is transmitted based on at least one predetermined parameter.

31. The method according to claim 23, further comprising the step of an operator interacting with the spreadsheet, the operator interaction affecting the transmitting.

32. The method according to claim 23, further comprising the step of an operator interacting with the spreadsheet, the operator interaction affecting the selecting.

33. The method according to claim 23, further comprising the step of an operator interacting with the spreadsheet, the operator interaction affecting the selecting, formatting and transmitting.

34. The method according to claim 23, further comprising the step of evaluating the accessability by a user.

35. The method according to claim 23, further comprising the step of displaying spreadsheet data in a graphic format.

36. The method according to claim 35, wherein the graphic format includes representations of symbol, price, order size and transaction type.

37. A method for computerized trading comprising the steps of:
receiving data from an exchange in real time;
transferring the received data to a spreadsheet;
processing the received data in the spreadsheet;
selecting at least one group of data from the spreadsheet;
formatting the selected at least one group of data for transmission to an order entry system of the exchange, the formatting involving converting each item of the selected at least one group of data from the spreadsheet into a corresponding variable for insertion into a previously programmed list of commands of an order entry system of the exchange; and
transmitting the formatted selected at least one group of data to the order entry system of the exchange; and
displaying the spreadsheet in a graphic format.

38. A computerized trading system comprising:
a display;
a receiver, the receiver receiving data from an exchange in real time;
a controller coupled to the receiver and to the display, the controller:
automatically transferring the received data to a spreadsheet,
automatically selecting at least one group of data from the spreadsheet, based on at least one parameter,
automatically formatting the selected at least one group of data for transmission to an order entry system of the exchange, the formatting involving converting each item of the selected at least one group of data from the spreadsheet into a corresponding variable for insertion into a previously programmed list of commands of an order entry system of the exchange; and
a transmitter coupled to the controller, the transmitter transmitting the formatted selected at least one group of data to the order entry system of the exchange.

39. The system according to claim 38, wherein the at least one parameter is predetermined.

40. The system according to claim 38, wherein the at least one parameter is variable.

41. A method for computerized trading comprising the steps of:
automatically receiving data from an exchange in real time;
automatically transferring the received data to a spreadsheet;
automatically selecting at least one group of data from the spreadsheet, based on at least one parameter;
automatically formatting the selected at least one group of data for transmission to an order entry system of the exchange, the formatting involving converting each item of the selected at least one group of data from the spreadsheet into a corresponding variable for insertion into a previously programmed list of commands of an order entry system of the exchange; and
automatically transmitting the formatted selected at least one group of data to the order entry system of the exchange.

42. The system according to claim 41, wherein the at least one parameter is predetermined.

43. The system according to claims 41, wherein the at least one parameter is variable.

44. A computerized trading system comprising:
a display; and
a controller coupled to the display, the controller:
receiving data from an exchange,
transferring the received data to a spreadsheet,
selecting a plurality of transactions based on the data transferred to the spreadsheet,
formatting the selected plurality of transactions into one order for transmission to an order entry system of the exchange, the formatting involving converting each item of a selected at least one group of data from the spreadsheet into a corresponding variable for insertion into a previously programmed list of commands of the order entry system, and
transmitting the formatted order to the order entry system of the exchange for execution of each one of the plurality of transactions as a single transaction.

45. A computerized trading system comprising:
a display; and
a controller coupled to the display, the controller:
receiving data from an exchange,
transferring the received data to a spreadsheet as a plurality of data items, capturing at least a portion of the data items transferred to the spreadsheet, formatting each captured data item as a variable for insertion into a previously programmed list of commands of an order entry system of the exchange, and performing a single transmit operation in order to transmit the list of commands to an order entry system of the exchange.

46. A method for computerized trading, comprising the steps of:

receiving data from an exchange;

transferring the received data to a spreadsheet;

selecting a plurality of transactions based on the data transferred to the spreadsheet;

formatting the selected plurality of transactions into one order for transmission to an order entry system of the exchange, the formatting involving converting each item of a selected at least one group of data from the spreadsheet into a corresponding variable for insertion into a previously programmed list of commands of an order entry system of the exchange; and transmitting the formatted order to the order entry system of the exchange for execution of each one of the plurality of transactions as a single transaction.

47. A method for computerized trading, comprising the steps of:

receiving data from an exchange;

transferring the received data to a spreadsheet as a plurality of data items;

capturing at least a portion of the data items transferred to the spreadsheet;

formatting each captured data item as a variable for insertion into a list of commands, the formatting involving converting each item of a selected at least one group of data from the spreadsheet into a corresponding variable for insertion into a previously programmed list of commands of an order entry system of the exchange; and performing a single transmit operation in order to transmit the list of commands to an order entry system of the exchange.

48. A computerized trading system comprising:

a display including a graphic display, the graphic display including representations of symbol, price, order size and transaction type;

a controller coupled to the display, the controller:
receiving data from an exchange in real time,
transferring the received data to a spreadsheet,
selecting a plurality of transactions based on the data transferred to the spreadsheet,
formatting the selected plurality of transactions into one order for transmission to an order entry system of the exchange, the formatting involving converting each item of a selected at least one group of data from the spreadsheet into a corresponding variable for insertion into a previously programmed list of commands of an order entry system of the exchange, and
transmitting the formatted order to the order entry system of the exchange for execution of each one of the plurality of transactions as a single transaction; and an interface coupled to the controller, the interface interacting with the graphic display, wherein the selecting, formatting and transmitting by the controller are controlled based on the interaction of the interface with the graphic display.

49. A computerized trading system comprising:

a display including a graphic display, the graphic display including representations of symbol, price, order size and transaction type;

a controller coupled to the display, the controller:
receiving data from an exchange in real time,
transferring the received data to a spreadsheet as a plurality of data items,
capturing at least a portion of the data items transferred to the spreadsheet,
formatting each captured data item as a variable for insertion into a previously programmed list of commands of an order entry system of the exchange, and
performing a single transmit operation in order to transmit the list of commands to an order entry system of the exchange; and an interface coupled to the controller, the interface interacting with the graphic display, wherein the capturing, formatting and transmitting by the controller are controlled based on the interaction of the interface with the graphic display.

50. A computerized trading system comprising:

a display;

a receiver, the receiver receiving data from an exchange in real time;

a controller coupled to the receiver and to the display, the controller:
automatically transferring the received data to a spreadsheet,
automatically selecting a plurality of transactions based on the data transferred to the spreadsheet, and
automatically formatting the selected plurality of transactions into one order for transmission to an order entry system of the exchange, the formatting involving converting each item of a selected at least one group of data from the spreadsheet into a corresponding variable for insertion into a previously programmed list of commands of an order entry system of the exchange; and a transmitter coupled to the controller, the transmitter transmitting the formatted order to the order entry system of the exchange for execution of each one of the plurality of transactions as a single transaction.

51. A computerized trading system comprising:

a display;

a receiver, the receiver receiving data from an exchange in real time;

a controller coupled to the receiver and to the display, the controller:
automatically transferring the received data to a spreadsheet as a plurality of data items,
automatically capturing at least a portion of the data items transferred to the spreadsheet, and
automatically formatting each captured data item as a variable for insertion into a previously programmed list of commands of an order entry system of the exchange; and a transmitter coupled to the controller, the transmitter performing a single transmit operation in order to transmit the list of commands to an order entry system of the exchange.

52. A method for computerized trading comprising the steps of:

automatically receiving data from an exchange in real time;

automatically transferring the received data to a spreadsheet;

automatically selecting a plurality of transactions based on the data transferred to the spreadsheet;

automatically formatting the selected plurality of transactions into one order for transmission to an order entry system of the exchange, the formatting involving converting each item of a selected at least one group of data from the spreadsheet into a corresponding variable for insertion into a previously programmed list of commands of an order entry system of the exchange; and automatically transmitting the formatted order to the order entry system of the exchange for execution of each one of the plurality of transactions as a single transaction.

53. A method for computerized trading comprising the steps of:

automatically receiving data from an exchange in real time;

automatically transferring the received data to a spreadsheet as a plurality of data items;

automatically capturing at least a portion of the data items transferred to the spreadsheet;

automatically formatting each captured data item as a variable for insertion into a previously programmed list of commands of an order entry system of the exchange; and automatically performing a single transmit operation in order to transmit the list of commands to an order entry system of the exchange.

* * * * *